Sept. 22, 1964  R. L. MONDANO  3,150,030
LAMINATED PLASTIC STRUCTURE
Filed April 6, 1960

INVENTOR
RALPH L. MONDANO

BY Melvin E. Frederick
ATTORNEY

United States Patent Office 3,150,030
Patented Sept. 22, 1964

3,150,030
LAMINATED PLASTIC STRUCTURE
Ralph L. Mondano, Cambridge, Mass., assignor to Raytheon Company, Waltham, Mass., a corporation of Delaware
Filed Apr. 6, 1960, Ser. No. 20,491
9 Claims. (Cl. 161—68)

This invention relates to laminated and sandwich structures and more particularly to laminated and sandwich body shell and radar reflector construction of new and improved lightweight, rigidity, and dimensional stability made of a minimum of metal while obtaining all of the advantages normally attributed to all metal structures.

Heretofore conventional commercially acceptable radar reflectors for use in aircraft, ship and land installations depended upon use of an all-metal concavity, or the like, all metal shield, either cast integrally or as a reflective unit, or made reticulate by metal bars, rods, strips, mesh, and the like. Such prior art devices are heavy in weight, costly in their manufacture and maintenance, and include the use of metal predominantly if not exclusively. Inasmuch as the large radar reflectors are most effective in use, the weight-size relationship becomes critical, particularly for aircraft use. It is also important, to a somewhat lesser extent, however, on ocean-going vessels, and even on land. Other types of radar reflectors while weighing less than all-metal radar reflectors are not entirely acceptable because they do not possess sufficient dimensional stability which is to say they are unduly deformable. The same disadvantage is also present in body shells and the like formed of plastic because of its relatively lightweight characteristics.

In view of the above considerations and others, it is the principal object of this invention to provide from readily available plastic and fibrous materials, a satisfactory and commercially acceptable laminated or sandwich structure for body shells, radar reflectors and the like utilizing a minimum of metal but without thereby diminishing either the utility, durability, or dimensional stability of devices of comparable size made in accordance with prior art teachings.

It is another object of this invention to provide increased dimensional stability in a plastic laminated structure.

It is another object of this invention to provide a new and improved plastic construction for radar reflectors incorporating woven metal strips as the electronically effective ingredient which also increases the dimensional stability of the reflector, and the plastic as a durable weather-resistant and non-corrosive structure foundation.

Yet another object of this invention is to provide a plastic radar reflector capable of satisfying rigid standards and whose utility is substantially unaffected by increases in size, i.e., disproportionate increases in weight, foundation and reinforcement are not required.

These and other objects and features of the invention, together with their incident features and advantages will be more readily understood and appreciated from the following detailed description of the preferred embodiment thereof selected for the purposes of illustration and shown in the accompanying drawings in which.

Figure 1:
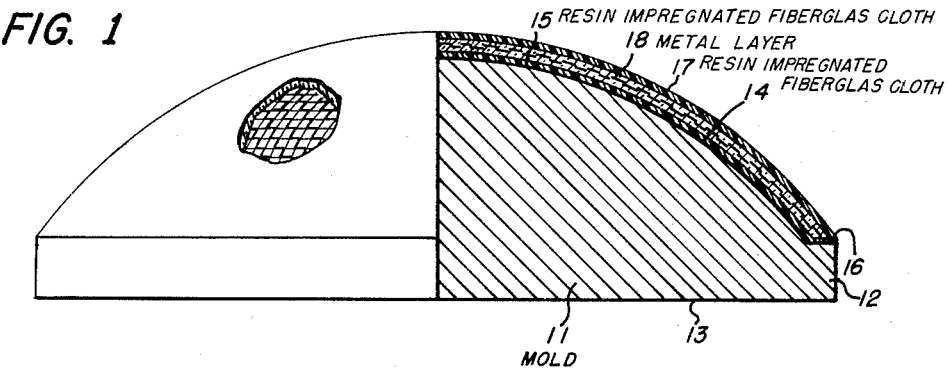
FIG. 1 is a pictorial view, partially in section, of a mold and plastic laminated structure constructed thereon in accordance with the teaching of this invention.

The apparatus of the invention is not limited to use as a radar reflector and may be used to form body shells, enclosures and the like subjected to use as a radar reflector to stresses. However, to facilitate the description of this invention the apparatus will be described in connection with radar reflectors only. Referring now to FIG. 1 there is illustrated by way of example a mold 11 having a rim 12 and base 13 by which the same is supported in any suitable fashion. The upper surface 14 of the mold 11 is convex to conform to the desired reflective shape of the intended reflector surface.

In the construction of a reflector used herein by way of example a layer of Fiberglas cloth 15, thoroughly impregnated with a resin, is closely laid over the upper surface 16 of the rim 12. Resin is also applied, prior to the application of the impregnated Fiberglas cloth 15 to the mold surface 14 and 16 by any suitable and well-known means. A suitable resin may be selected from the unsaturated polyester types or other types of thermosetting resins that are commercially available. The purpose of the first layer of cloth 15 and the second layer of cloth 17 described hereinafter is to provide a weather-proof coating to protect the thin layer or laminate 18 of interwoven metal strips disposed therebetween from oil, corrosion and the like, to provide a body which is conveniently and easily removed from the mold upon completion of the product, and to provide a certain amount of strength. For such purposes one or more Fiberglas woven mats of, for example, ten thousandths of an inch thickness may be used.

The initial layer of Fiberglas cloth 15, together with the resin impregnated therein and thereunder, is next cured in conventional manner such as, for example, in an oven for approximately two and one-half hours, at approximately 250 degrees Fahrenheit, or other satisfactory temperature and time.

Figure 2:
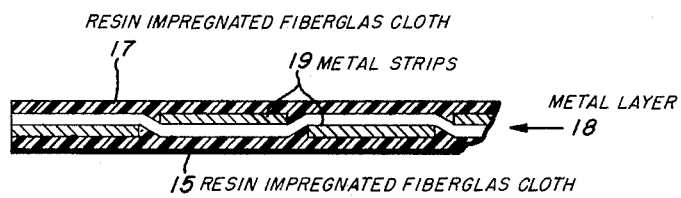
FIG. 2 is a greatly enlarged fragmentary sectional view of a finished plastic laminated structure embodying this invention.

After curing of the Fiberglas cloth 15 impregnated with resin, the exposed upper surface of the Fiberglas layer or laminate 15 is subjected to sandblasting to provide a satisfactory surface for the next operation, which is the application of the thin and substantially continuous layer or laminate 18 comprising a plurality of interwoven metal strips. The layer of metal 18 is formed by interlacing strips of preferably high strength metal of shim stock thickness in a basket weave. Cold rolled shim stock of approximately two thousandths of an inch in thickness and one inch wide has been found advantageous. The interwoven metallic strips 19 best shown in FIG. 2 form the thin and substantially continuous layer of metal 18 which is then etched on all surfaces in a suitable solution such as, for example, HCl and HF. Immediately after removal from the etching solution a suitable coating such as, for example, a nitril phenolic adhesive coating is applied to the interwoven metal strips. This coating serves the dual purpose of eliminating the possibility of oxidation occurring at the surface of the metal and provides a readily bondable surface by which the interwoven metal layer 18 can be joined to the Fiberglas laminate 15 on the mold. The metallic laminate 18 which is self-forming is then placed on the mold on top of the Fiberglas mat. In addition to its contribution to the superior dimensional stability of the product, inasmuch as the interwoven metal strips are virtually self-forming, the metal laminate formed therefrom may be easily and simply applied to an infinite number of surface configurations and will conform smoothly thereto in practically all cases. If desired the width of certain of the metal strips can be varied along their length in a predetermined manner to form a truly smooth and continuous laminate.

A wet layup comprising a second layer of Fiberglas cloth 17 impregnated with resin and identical to that described in connection with Fiberglas cloth 15, except that it has not been cured is then placed over the coated metallic laminate 18.

After positioning of the layers 15, 18, and 17 as and in the order described hereinabove the structure is then vacuum bagged and the second layer of Fiberglas cloth 17 impregnated with resin is cured in conventional manner. Thereafter the cured laminated structure is removed from the mold 11 as by physically stripping and the edge of the structure trimmed off and sealed as desired or required.

Figure 3:
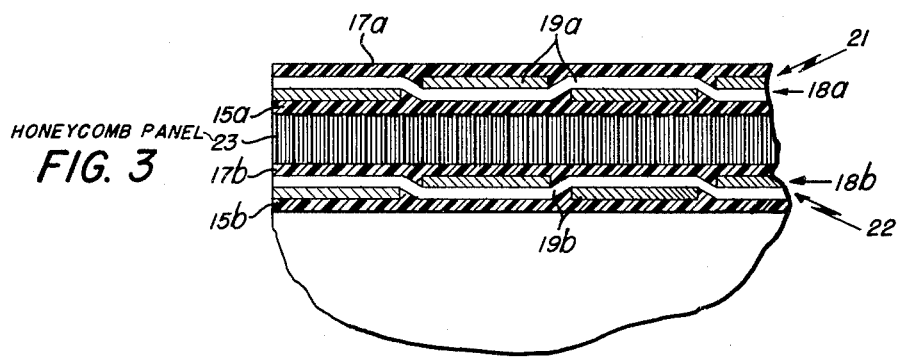
FIG. 3 is a greatly enlarged fragmentary sectional view of one edge of a modified finished plastic sandwich structure embodying this invention.

For certain specific applications it may be desirable to provide a laminated and/or sandwich structure having maximum strength and dimensional stability. The laminated and/or sandwich structure as shown in FIG. 3 has all of these advantages in addition to providing substantially identical coefficients of expansion at both surfaces of the structure which contribute to the maintenance of accurate contours. As shown in FIG. 3 the structure is comprised of two outer portions or laminates 21–22 identical to the three ply laminated structure described hereinabove comprised of, respectively, Fiberglas layers 15a–17a, and the layer 18a comprised of woven metal strips 19a, and Fiberglas layers 15b–17b and the layer 18b comprised of woven metal strips 19b. The components comprising the aforementioned outer portions 21–22 identified respectively by the subscripts a and b are assembled in the manner described hereinabove in connection with FIGS. 1 and 2 and are bonded to and cover a honeycomb core 23. The honeycomb itself may comprise woven Fiberglass impregnated with a polyester resin. The individual cells of the core by way of example may be hexagonal and may extend continuously from the inside to the outside walls of the core. A layer of resin is provided between the outside walls of the core and each adjacent Fiberglas layer 15a–15b to provide a secure bond.

A laminated structure constructed in accordance with this invention has excellent weather-resistant qualities and may be used either exposed to the elements or protected by suitable means. More importantly, however, it provides improved and superior dimensional stability over that possible with laminated prior art structures by reason of the interwoven metal strips which aid in providing superior dimensional stability and strength and in the case of radar reflectors simultaneously acts as the electronically effective ingredient. In other applications the metal strips simultaneously function as a heat barrier or heat sink.

Although I have herein shown and described my invention and what I have conceived to be the most practical and preferred embodiment, it is recognized that it may be used to form body shells, enclosures and the like as well as radar reflectors and that departures may be made therefrom within the scope of my invention which is not to be limited to the details disclosed herein but is to be accorded the full scope of the claims so as to include any and all equivalent structures.

What is claimed is:

1. A laminated product comprising: a first layer of a fiber reinforced resinous laminate; a thin substantially continuous layer of flat interwoven abutting metal strips; and a second continuous layer of fiber reinforced resinous laminate, said layers being securely adhered to said metal by means of a resin interposed therebetween.

2. A laminated product comprising: a first continuous layer of a fiber reinforced resinous laminate; a plurality of thin metallic strips interwoven one with another in abutting relationship to form a thin and substantially continuous metal laminate; and a second continuous layer of fiber reinforced resinous laminate, said layers being securely adhered to said metal by means of a resin interposed therebetween.

3. A laminated product comprising: a first continuous layer of a fiber reinforced resinous laminate; a plurality of thin high strength metallic strips having a width substantially greater than its thickness, said strips being interwoven one with another in a basket weave to form a substantially flat and continuous metal laminate; and a second continuous layer of fiber reinforced resinous laminate, said layers being securely adhered to said metal by means of a resin interposed therebetween.

4. A laminated product comprising: a first continuous layer of a fiber reinforced resinous laminate; a plurality of high strength shim stock metallic strips having a width substantially greater than its thickness, said strips being interwoven one with another in a basket weave to form a substantially smooth and continuous metal laminate; and a second continuous layer of fiber reinforced resinous laminate, said layers being securely and smoothly adhered to said metal by means of a resin interposed therebetween.

5. A laminated product comprising a structure, which structure, proceeding from one surface thereof to an opposite surface thereof, comprises: a first continuous layer of a fiber reinforced resinous lamina; a plurality of shim stock thickness metallic strips having a width substantially greater than their thickness, said strips being interwoven one with another in abutting relationship to form a first substantially smooth and continuous layer of metal; a second continuous layer of a fiber reinforced resinous laminate; a resinous cellular material substantially thicker than the metal layer; a third continuous layer of fiber reinforced resinous lamiate; and a second substantially smooth and continuous layer of metal substantially identical to said first layer of metal, said layers of fiber and metal being securely adhered one to another and to said cellular material by means of a resin interposed therebetween.

6. A laminated product comprising a structure, which structure, proceeding from one surface thereof to an opposite surface thereof, comprises: a first continuous layer of a fiber reinforced resinous laminate; a plurality of flat, high strength shim stock thickness metallic strips having a width substantially greater than their thickness, said strips being interwoven one with another in a basket weave to form a first substantially smooth and continuous metal laminate; a second continuous layer of a fiber reinforced resinous laminate; a resinous cellular material substantially thicker than the metal laminate; a third continuous layer of fiber reinforced resinous laminate; a second substantially smooth and continuous metal laminate substantially identical to said first laminate metal; and a fourth continuous layer of fiber reinforced resinous laminate, said fiber and metal laminates being securely adhered one to another and to said cellular material by means of a resin interposed therebetween.

7. A radar reflector comprising: a first continuous layer of a fiber reinforced resinous laminate; a thin substantially continuous layer of interwoven abutting metal strips; and a second continuous layer of fiber reinforced resinous laminate, each of said layers being securely adhered to a different side of said metal by means of a resin interposed therebetween.

8. A radar reflector comprising: a first continuous layer of a fiber reinforced resinous laminate; a plurality of metal strips having a width substantially greater than their thickness, said strips being interwoven one with another in abutting relationship to form a substantially smooth and continuous metal laminate; and a second layer of continuous fiber reinforced resinous laminate, said layers being securely adhered to opposite sides of said metal by means of a resin interposed therebetween.

9. A radar reflector comprising: a first continuous layer of a fiber reinforced resinous laminate; a plurality of metallic strips having a width substantially greater than their thickness, said strips being interwoven in abutting relationship with one another to form a first substantially smooth and continuous layer of metal; a second continuous layer of a fiber reinforced resinous laminate; a resinous cellular material substantially thicker than the metal layer; a third continuous layer of fiber reinforced resinous laminate; and a second substantially smooth and continuous layer of metal substantially identical to said first layer of metal, said layers of fiber and metal being securely adhered one to another and to said cellular material by means of a resin interposed therebetween.

References Cited in the file of this patent

UNITED STATES PATENTS

| 1,983,617 | Ladon | Dec. 11, 1934 |
| 2,742,387 | Giuliani | Apr. 17, 1956 |
| 2,747,180 | Brucker | May 22, 1956 |
| 2,763,586 | Noyes | Sept. 18, 1956 |
| 2,948,896 | Hart | Aug. 9, 1960 |
| 3,047,860 | Swallow et al. | July 31, 1962 |

FOREIGN PATENTS

| 826,939 | Great Britain | Jan. 27, 1960 |